United States Patent Office 3,491,327
Patented Jan. 20, 1970

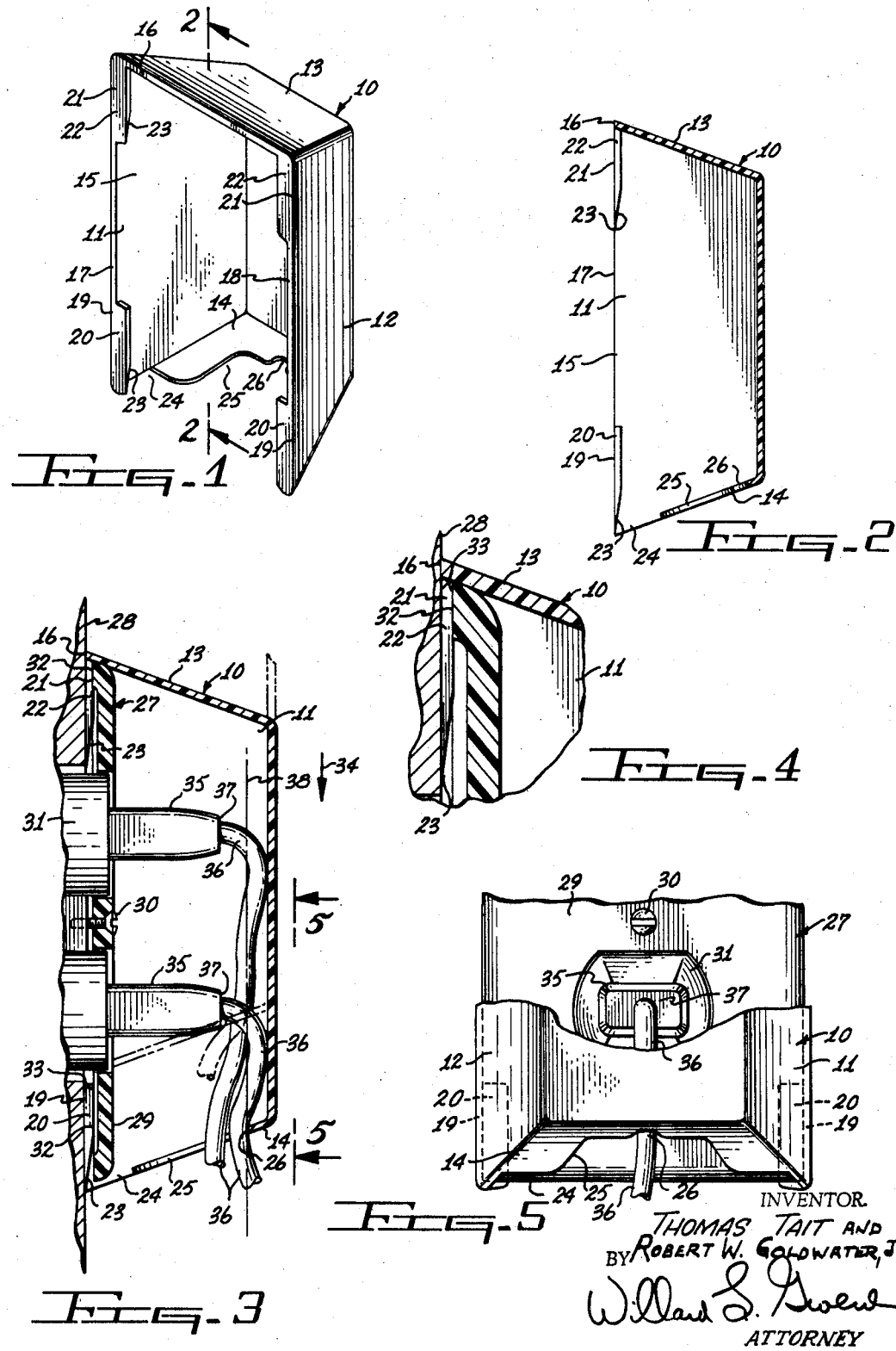

3,491,327
SAFETY COVER FOR ELECTRICAL PLUG OUTLETS
Thomas Tait, Phoenix, Ariz. (% Westland Plastics Inc., 800 N. Mitchell Road, Newbury Park, Calif. 91320), and Robert W. Goldwater, Jr., 1110 W. Frier Drive, Phoenix, Ariz. 85021
Filed Nov. 20, 1967, Ser. No. 684,200
Int. Cl. H01r 13/44, 13/54; H05k 5/03
U.S. Cl. 339—36                                         2 Claims

ABSTRACT OF THE DISCLOSURE

A safety cover for electric plug outlets that is a substantially rectangular box-shaped cover having the front, sides and top surfaces completely enclosed with a partially enclosed bottom surface and an elongated wall-facing opening, the wall-facing opening being provided with an inwardly extending flange formed on each end of its longitudinal edges, each of the flanges being provided with a downwardly facing inclined plane so that when the face plate of the electrical outlet is loosened, and the safety cover is slid down into position, the wedging force of the inclined planes between the wall and the back of the face plate will retighten the plate and firmly mount the cover thereto. The safety cover is of sufficient depth to house the plugs, and the partially enclosed bottom surface permits the plugs to remain in place when the cover is being installed and the partially enclosed bottom surface is formed so that the electric cords extending therefrom will resist the removal of the cover.

Cross-references to related applications

There are no cross-references to related applications.

Background of the invention

The field of the invention lies in electric wall outlets and is particularly directed to a safety cover for electric wall outlets.

Heretofore safety covers for electric outlets required a special retainer plate installed under the face plate to which the cover was demountably attached by tension latches. Another prior art structure was screwed to a special retainer. Still another prior art structure required the use of tools to loosen the face plate each time a plug was removed or installed.

Summary of the invention

In applicants' invention it is an object to provide a safety cover for electric outlets which is simple to form and inexpensive to manufacture.

Another object of the invention is to provide a safety cover for electric outlets which prevents children from contacting the terminals of the outlet.

Another object of the invention is to provide a safety cover for electric outlets that is adapted to be installed on outlets now in use.

And it is an object to provide the aforementioned device which is easy to install, and subsequent removal and reinstallation does not require the use of tools.

Brief description of the drawings

FIG. 1 is a perspective view of the safety cover for an electric outlet illustrating the features of this invention.

FIG. 2 is a sectional view of the safety cover on the line 2—2 of FIG. 1.

FIG. 3 is a sectional view of the safety cover mounted on an electrical wall outlet.

FIG. 4 is an enlarged fragmentary sectional view of a wall outlet face plate with a flange of the safety cover installed.

FIG. 5 is a fragmentary sectional view on the line 5—5 of FIG. 3.

Description of the preferred embodiment

As an example of the preferred embodiment there is shown an electric wall outlet safety cover indicated generally at 10. As best shown in FIGS. 1 and 2 the cover 10 is a substantially box-shaped structure having side surfaces 11 and 12, top surface 13, partially open bottom surface 14, and wall facing open base 15. The base 15 is a rectangular opening circumvented on the top by edge 16, and on its sides by edges 17 and 18 with the bottom being open. The lower ends 19 of side edges 17 and 18 have inwardly extending flanges 20, and the upper ends 21 of edges 17 and 18 are provided with inwardly extending flanges 22. Each flange 20 and 22 is provided with a downwardly facing inclined plane 23 formed in its lower portion. The bottom surface 14 of cover 10 is formed with face plate admitting open area 24, a plug admitting open area 25, and a cord admitting open area 26.

FIGS. 3, 4 and 5 illustrate the safety cover 10 installed on a standard electric wall outlet 27 mounted in wall 28, the outlet 27 being provided with a face plate 29 and a face plate mounting screw 30 which demountably attaches the plate 29 to a receptacle 31. The receptacle 31 is recessed into wall 28 so that when plate 29 is mounted to the receptacle the peripheral edges 32 of the plate 29 engage the wall.

To install the safety cover 10 on outlet 27, the face plate mounting screw 30 is loosened to provide a gap 33 between the wall 28 and the face plate 29. To provide optimum cover mounting characteristics the gap 33 should be slightly smaller than the thickness of the flanges 20 and 22 as will hereinafter be described in detail. With the cover 10 positioned above the outlet 27 so that face plate 29 enters open area 24 of bottom surface 14, and the inclined planes 23 of flanges 20 inserted in the gap 33, movement of the cover 10 in the direction of arrow 34 will wedge the inclined planes 23 into gap 33 thus deflecting the face plate 29 to permit complete insertion of the flanges 20 in gap 33. Further movement of the cover 10 in the direction of arrow 34 will permit similar insertion and entry of flanges 22. With the safety cover 10 thus installed, it will be firmly held in position by peripheral edges 32 of face plate 29.

The open areas 25 and 26 of bottom surface 14 permits the cover 10 to be installed with the plugs 35 in position within the receptacle 31. The safety cover 10 may also be used to prevent the insertion of metallic objects into the receptacle when plugs 35 are not used.

Removal of the safety cover 10 from the outlet 27 is inhibited not only by the restraining forces exerted by the peripheral edges 32, but also by the relative position of the cord admitting open area 26. As best seen in FIGS. 3 and 5, area 26 is in vertical alignment with the cord emitting ends 37 of plugs 35. Removal of the cover 10 will cause the area 26 to travel along line 38 of FIG. 3, thus the cords 36 must pass through the area 26 or the cover 10 cannot be removed. A further inhibiting force is exerted by cords 36 when area 26 forms an interference-fit by depressing the cords 36 into a small arc as shown in broken lines of FIG. 3.

While the apparatus herein disclosed and described constitutes a preferred form of the invention, it is also to be understood that the apparatus is capable of mechanical alteration without departing from the spirit of the invention.

We claim:
1. An electrical wall outlet safety cover comprising in combination:
- (A) a box-shaped structure having,
- (B) side surfaces,
- (C) a top surface,
- (D) a bottom surface,
- (E) and a wall facing open base including a rectangular opening circumvented by the top and by side edges with the bottom being open,
- (F) inwardy extending flanges formed on the lower ends of the side edges,
- (G) further inwardly extending flanges formed on the upper ends of the side edges,
- (H) downwardly facing inclined planes formed on the lower portions of each of the inwardly extending flanges,
- (I) a face plate admitting open area including,
- (J) a plug admitting open area,
- (K) and a cord admitting open area cut in the front portion of the plug admitting open area so that the cover may be slid downwardly behind the face plate while in engagement with the wall surface with the electric plugs and associated cords in connected position in the outlet,
- (L) a front panel, formed integral with the front edges of the sides, top and bottom surfaces,
- (M) and an inside surface on the front panel facing toward the wall and outlet engaging the cord in turned over position as the cord projects from the cord admitting end of the plug when in connected position in the outlet so as to prevent disconnection of the plug from the outlet.

2. An electric wall outlet safety cover as in claim 1 wherein the distance between the inside surface of the front panel and the cord admitting end of the plug is less than the distance of movement required to withdraw the plug from the outlet receptacle.

References Cited

UNITED STATES PATENTS 2,415,602   2/1947   Monaco _____ 174—48
3,013,105   12/1961   Craig _____ 174—67

MARVIN A. CHAMPION, Primary Examiner

JOSEPH H. McGLYNN, Assistant Examiner

U.S. Cl. X.R.

174—67; 339—75